Nov. 11, 1941.  G. F. BAHR  2,262,484
CIGAR LIGHTER
Filed April 1, 1937
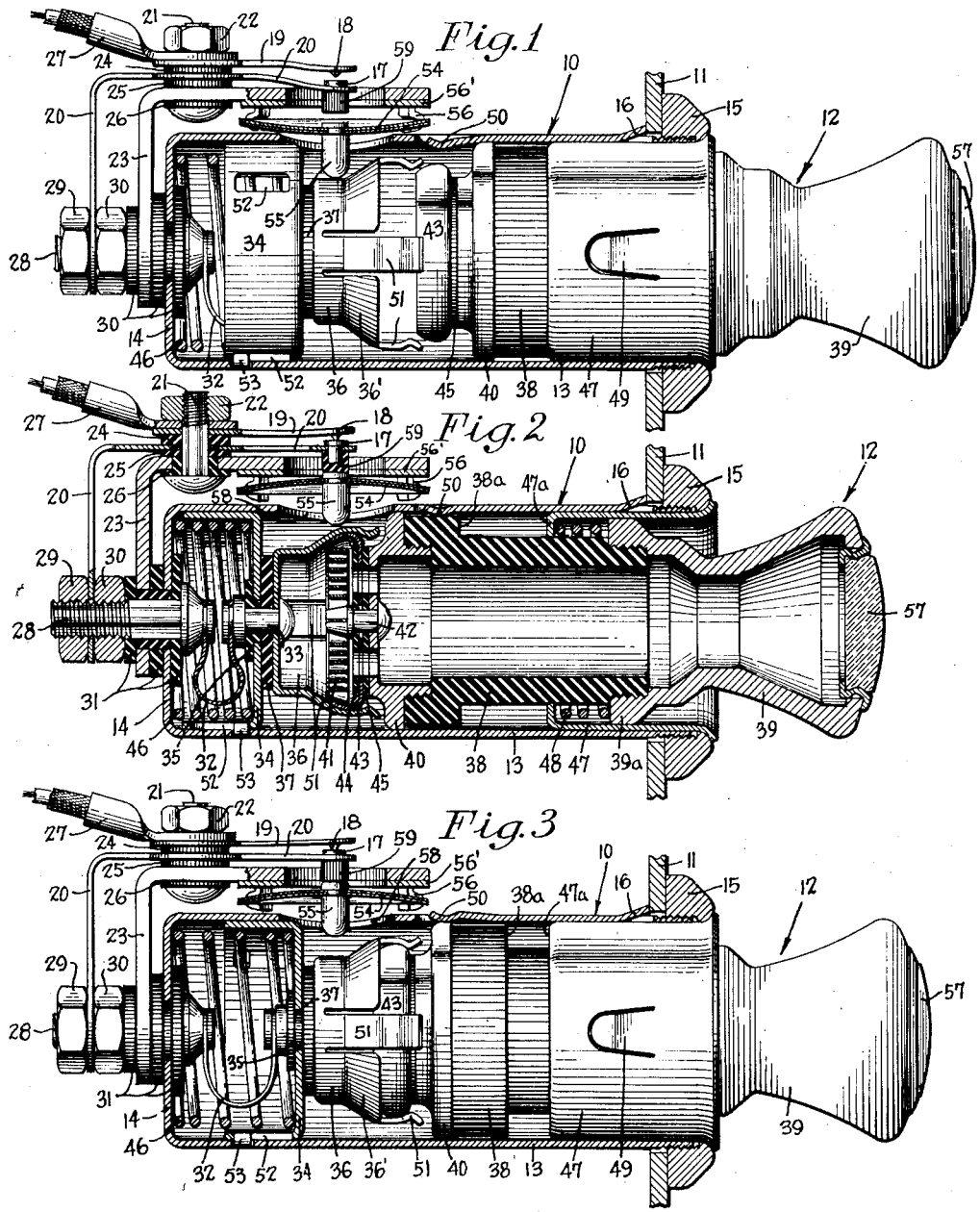
INVENTOR
Gustave F. Bahr,
BY
ATTORNEY Patented Nov. 11, 1941

2,262,484

UNITED STATES PATENT OFFICE 2,262,484

CIGAR LIGHTER

Gustave F. Bahr, Fairfield, Conn., assignor to Automatic Devices Corporation, Bridgeport, Conn., a corporation of Connecticut Application April 1, 1937, Serial No. 134,299

11 Claims. (Cl. 219—32)

This invention relates to electric cigar lighters, and, more particularly, to devices of this character for use in automobiles, or elsewhere.

Lighters for cigars, cigarettes and the like, of the kind just indicated, commonly comprise a holding device electrically served by connections to a source of current to provide a circuit having a gap, and, in combination with the holder, an igniting unit adapted to be carried by and removed from the holder for storage and use respectively. Such units have a heating element, and means are provided such that while the unit is on the holder, the gap in the circuit may be closed and the heating element interposed therein for heating to incandescence.

In previously proposed lighters of this kind, a thermostatically controlled means has been provided for automatically operating to break the circuit for the heating element when the same reaches a predetermined temperature for use, such means including a bimetallic element deformed, by heat transmitted from the heating element, to break the circuit when the heating element reaches the predetermined temperature.

A difficulty has been to provide a bimetallic thermostat which in becoming redisposed from circuit making to circuit breaking condition does so abruptly, and at high speed, and without preliminary drag against a part with which it is in electrical contact. A distinct snapping action is required, if breaking of the circuit is to be accomplished without any possibility of arcing and without danger of pitting or other injury to the contacts by which the circuit is made and broken. Very little difference of speed in breaking a circuit means a big difference in arcing.

According to the present invention, this difficulty has been overcome, and a lighter having other special advantages is provided, by employing a thermostatic element in the form of a bimetallic disk or equivalent which is dished or buckled, and preferably in such manner that while cold it will remain bellied in either direction when mechanically sprung to belly in that direction, but which has its metals of differing coefficients of expansion so chosen and arranged that, provided the disk has been previously mechanically sprung to belly in the prevised one of its two directions of bellying, it will, when heated, redispose itself to belly in the opposite direction. The action of the disk in thus reversing its bellying is, first a fairly slow reshaping of the same toward planiform condition, and then, as it passes just beyond planiform condition and begins to belly in the new direction, an instantaneous and powerful snap to full bellying in this direction. The approach of the disk to planiform condition is fairly slow only in a relative sense, that is, in relation to the very high speed of its snapping action.

By the present invention, this snapping action of the disk is employed to break the energizing circuit at the instant the heating element becomes energized sufficiently for use.

In a broader aspect of the invention, the same provides as a make and break controller for the energizing circuit of an electric cigar lighter, a dished bimetallic thermostat which when bellied in one direction closes the circuit, and which when bellied in the opposite direction, this last as the result of heating the thermostat, opens the circuit.

With the thermostat dished or buckled for operation in the preferred manner already described, it is preferably carried by the holder in such way that when the removable igniting unit is moved to energizing position the thermostat is subjected to mechanical thrust to belly it oppositely to that bellying to which it will snap when heated.

Other features and advantages will hereinafter appear.

In the accompanying drawing, illustrating my invention embodied in a lighter of the kind including a well type holder, and one incorporating a removable igniting unit of the spring-sleeve type:

Figure 1 is a view showing the holder in axial section, and the igniting unit in shallow or storage position therein.

Fig. 2 is an axial section through both the holder and the igniting unit, showing the arrangement of the parts just following manual insertion of the unit to deep position in the holder.

Fig. 3 is a view similar to Fig. 1, but showing the unit redisposed in the holder following manual release thereof.

The lighter of the present invention, in the exemplifying structure shown in the accompanying drawing, includes a holding device 10, secured to a panel 11, as the instrument board of an automobile, and a removable igniting unit 12.

The holding device 10 includes a tubular metal shell 13 having an integral rear wall 14, and at its front end externally threaded to carry a nut 15 for securing the shell to the panel. The side wall of the shell near its front end is provided with a plurality of tongues 16 lanced outward therefrom and adapted to engage the back of panel 11 so that when the nut is tightened against the panel the shell will be held securely thereto.

The well 13 is therefore electrically connected to the panel 11, and so is grounded in the usual way to a source of energy, as the battery of a car. The shell is thus adapted to serve as a contact for engaging the igniting unit 12 to complete a circuit therethrough.

This circuit is normally open between a pair of contacts 17 and 18, resiliently held apart because carried by spring metal strips 19 and 20 mounted on a single threaded stud 21 secured by a nut 22 to an L-shaped metal bracket 23. The contacts 17 and 18 are insulated from each other and from the bracket by insulation washers 24 and 25 and an insulation piece 26 as shown best in Fig. 2.

Also engaging the stud 21 and clamped against the strip 19 carrying the contact 18 is a terminal clip 27 from the source of current. The strip 20 carrying the contact 17 is L-shaped, like the bracket 23, and these parts are mounted on a threaded stud 28, clamped to the rear wall 14 of the shell 13 by nuts 29 and 30. By means of insulation shown most clearly at Fig. 2 at 31, the bracket 23 is insulated from any part of the holder.

The strip 20 carrying contact 17, however, while insulated from the shell 13 of the holder, is in electric connection with the stud 28, and this stud is connected by a flexible metal strip 32 with another stud 33 mounted for axial movement within the holder. The stud 33 is carried by a metal slide cup 34, but insulated therefrom as indicated at 33 in Fig. 2. The forward end of stud 33 is headed over to mount securely thereon a metal detent cup 36, insulated at 37 from the slide cup, for impositively seizing the inner end of the igniting unit 12 and for otherwise functioning in ways later to be described.

The igniting unit comprises a tubular body 38 of insulating material, externally threaded at its front end to carry a knob 39, and internally threaded at its inner end to carry a metal cap 40, on which is mounted a heating element 41. This element is shown as a spirally wound resistance band connected at its inner end to a stud 42 fixed on cap 40, and connected at its outer end to a metal latch cup 43 for cooperating with the detent cup when the igniting unit 12 is manually moved to cause the parts as in Fig. 1 to become redisposed as in Fig. 2. The latching cup 43 is insulated from the cap 40, to avoid short-circuiting of the heating element 41, by apertured insulation disks 44 and 45.

Normally, that is, with the igniting unit in shallow or storage position in the holder as in Fig. 1, the slide cup 34 is yieldingly held in the position shown in this view by an expansile coil spring 46, to dispose the detent cup 36 as there shown.

Also normally, the latching cup 43 is advanced sufficiently toward the mouth of the holder to be clear of the detent cup.

In order that the latching cup 34 may be yieldingly held thus cleared away from the detent cup, even with the spring 46 uncompressed, the knob 39 is provided with a cylindrical portion 39a adapted slidably to fit within a metal sleeve 47 which forms a part of the igniting unit. The front of the sleeve 47 has an outward annular flare to engage the nut 15, so that the sleeve is held against insertion in the holder to a greater extent than as shown in the drawing, and the inner end of the sleeve has an inturned flange 47a for sliding along the main cylindrical exterior of the tubular body 38. Within the sleeve and between it and the body 38 is an expansile coil spring 48 which urges the knob 39 outwardly and toward its normal position as in Fig. 1, when an external shoulder 38a on the tubular body 38 abuts the rear face of the flange 47a. The igniting unit is held in the holder against casual removal by a resilient tongue 49 lanced from the sleeve 47 and biased inwardly to have pressure engagement with the shell 13.

In order that when the parts are arranged as shown in Fig. 3, which shows their disposition during energizing of the heated element of the unit 12, good grounding contact will be insured between the cap 40 and the shell 13 of the holder, a resilient tongue 50 is lanced from the shell 13 and biased inward thereof; and this tongue is so located on the shell 13 as to have pressure engagement with the cap 40 while the unit remains in the position shown in Fig. 3.

The parts become arranged as in Fig. 3, for energization of the heating element of the igniting unit, upon manual release of the knob 39 after it has been pushed in to move the unit 12 from the position of Fig. 1 to that of Fig. 2. The detent cup 36 carries a plurality of forwardly projecting integral spring fingers 51 shaped at their outer or front ends to allow the latching cup 43 to be snapped therebetween during the movement of the unit 12 from the position of Fig. 1 to that of Fig. 2.

The detent cup 36 maintains a sufficiently strong impositive grip on the latching cup 43 to insure that on manual release of the knob the igniting unit will become disposed in the holder as in Fig. 3.

It will be noted that whereas in Fig. 1 the shoulder 38a is abutted against the rear end of sleeve 13, in Fig. 3 this shoulder is spaced from the sleeve although at a less distance therefrom than in Fig. 2. In other words, while the spring 46 behind the slide cup 34 is fully expanded, the spring 48 within the sleeve is only partially expanded.

In order to halt slide cup 34 as shown in Fig. 3, thereby to maintain the igniting unit in the condition last described, so that the energizing circuit for the heating element 41 will surely be grounded through the unit and the shell 13 because of the resilient pressure of the tongue 50 of the shell against the cap 40 of the unit, a pin-and-slot connection is provided between the shell and the slide cup. This cup is slotted as indicated at 52, and riding in this slot is a pin or lug 53 struck in from the shell.

Thus in the form of the invention illustrated, the igniting unit is sent from normal to energizing position by movement first in one direction and then in the opposite direction; the first movement, inward of the holder 10, being due to manual push on the knob 39, and the second movement, outward of the holder, being caused by full expansion of the spring 46, accompanied by partial expansion of the spring 48.

This first or inward movement of the igniting unit is employed for mechanically redisposing a bimetallic thermostat 54, thereby to set the same for closing the energizing circuit at the contacts 17 and 18. This thermostat is shown as a disk so dished that it may be mechanically snapped to force tightly together the contacts 17 and 18. The means for thus snapping the thermostat 54 comprises a stud 55 secured to the thermostat, a mounting of the thermostat in cradles 56 engaging its periphery at spaced points therearound and formed from a metal plate 56' suitably secured as by welding to the bracket 23, and an actuator for the stud, constituted by a conical wall 36' forming part of the detent cup 36. When the knob 39 is manually pushed in the holder, the latching cup 43 first enters the detent cup 36, and then the latter moves with and ahead of the unit over a long enough path of travel lengthwise of the holder to cause the conical wall 36', acting as an inclined plane relative to the stud 55, to give an upward axial thrust on the stud and so snap the thermostat to the upward bellying shown in Fig. 2.

The second or return movement of the unit from the position of Fig. 2 to that of Fig. 3, occurring as soon as the knob 39 is released, not only brings the metal cap 40 of the unit in tight contact with the shell 13 of the holder by way of the tongue 50 of the latter as already explained, but also clears the conical wall 36' away from the stud 55.

As a result, the igniting unit is now (Fig. 3) in an intermediate position on the holder, between its position (Fig. 2) of maximum insertion in the holder, the switch closing position, and its normal or storage position (Fig. 1).

While the igniting unit is in this intermediate position in the holder, the heating element 41 is being energized to incandescence, with an accompanying increase of temperature in the thermostat 54.

The thermostat 54 is so dished or buckled that when cold it will remain bellied either as in Fig. 1 or as in Fig. 2, but has its metals of different coefficients of expansion so related that, provided it has been snapped when cold to belly as in Fig. 2, it will, on becoming heated to a predetermined temperature, such as it would attain on the heating element 41 becoming fully energized, snap to a bellying in the opposite direction. That is, the thermostat 54 will be automatically snapped back to its normal or downwardly dished circuit-opening condition, that of Fig. 1, upon becoming heated to an extent which corresponds to an energization of the heating element 41 to incandescence. This snapping back of the thermostat is properly prepared for, because as above explained the conical wall 36' is cleared away from the lower rear end of stud 55 by automatic return of the igniting unit to the position shown in Fig. 3, brought about by the expansion of springs 46 and 48 on manual release of the knob 39.

As soon as the heating element 41 reaches incandescence, and the thermostat 54 snaps back to the condition shown in Fig. 1, the energizing circuit for the heating element 41 is opened by separation of the contacts 17 and 18.

As the thermostat thus snaps back to normal condition, it emits a loud click, thereby giving automatic warning that the igniting unit is ready for removal and use.

At the same time a visual signal having the same significance is flashed. In the present case this is provided for by making the knob 39 hollow as shown and inserting a translucent lens 57 in the end thereof. As the heating element 41 becomes incandescent, light therefrom passes through the matching apertures in the insulation disks 44 and 45 and in the transverse wall of cap 40 adjacent to these disks, and in turn through the hollow body 38 and knob 39 of the unit to the lens 57.

To facilitate heat transfer from the heating element to the thermostat 54, with the latter as here wholly exterior to the shell 13 of the holder, there is an opening 58 in the shell, through which the stud 55 extends, of considerable size.

When the igniting unit is ready for removal and use, a pull on the knob 39 breaks the grip of the detent cup 36 on the latching cup 43, thus freeing the unit from the holder, and allowing the former to be completely withdrawn from the holder, during which withdrawal the spring 48 on the unit completes its expansion, in turn to cause the sleeve 47 and shoulder 38a to return to abutting relation as shown in Fig. 1.

It will be noted that according to the arrangement described the thermostat 54 is a pure operator, that is, it operates a switch but without itself acting as one of the switch contacts. Also as shown, the thermostat is insulated from both these contacts 17 and 18, even when bellied upward as in Fig. 2 to close the switch, due to the mounting of an insulating button 59 on the metal strip 20 carrying the contact 18.

With the entire switch assembly exterior to the holder, and arranged as illustrated, and including the insulating element 59, which may be an insulator against the conduction of heat as well as electricity, as may also be the insulating elements 24, 25 and 26, the contacts 17 and 18 may be kept cool despite the responsiveness of the thermostat to heat from heating element 41.

Then, also, the thermostatic switch assembly is in an ideal location for accurate inspection and ready replacement of the entirety of the same or of any of the parts thereof including the circuit connections directly associated therewith.

It will be noted that a preferred feature of the invention is the employment of an actuator, in the form of the invention illustrated embodied in the conical wall 36' of the detent cup 36, for imparting a mechanical thrust to the disk to belly it oppositely to that bellying to which it will snap when heated, which operates on the inclined plane or wedge principle. Such an actuator is very conveniently employed in a lighter, as illustrated, having a holder of the well or socket type, by arranging that it be operated incidental to a comparatively large travel of the igniting unit inward of the holder in moving the unit from storage position toward energizing position. Thus a fairly light inward push on the knob 39 may result in a much more powerful thrust against the thermostatic snap disk in the direction required to snap it to cause reversal of its bellying from that prevised for circuit opening to that prevised for circuit closing. While the disk moves very quickly in one direction to a bellying in the opposite direction, it is fairly hard thus to snap.

Variations and modifications may be made within the scope of this invention, and portions of the improvements may be used without orders.

I claim:

1. In an electric cigar lighter, a holding device; an igniting unit having a heating element and supported by the holding device and removable therefrom for use, said unit being manually movable on the holding device from an open-circuit position to a closed-circuit position and vice versa; means for closing a normally open circuit through the heating element when the igniting unit is moved to said circuit-closing position, said means including a dished bimetallic element adapted to be positively flexed in one direction to close said circuit but adapted automatically to flex in the opposite direction when heated to thereby open said circuit, said element being in heat-receiving relation with the heating element; means operative on moving the unit to circuit-closing position to cause said element to flex in the direction first-mentioned, said means including an actuator which imparts a thrust to said bimetallic element in the direction of its flexure when flexed to circuit-closing position; and means for moving said actuator to cause it to release its thrust against the bimetallic element after the igniting unit has been moved to its circuit-closing position.

2. In an electric cigar lighter, a holder; a heating element; an igniting unit carrying said element and positionable on and removable from the holder, for storage or energization, and for use, respectively; means for energizing said element including a circuit having subdivisions carried by the holder; a normally open switch having a bimetallic thermostat adapted to flex to a convex curvature in either of two opposite directions, said thermostat being flexible to close the switch and thereby close said circuit to cause energization of the heating element when the igniting unit is on the holder, the unit being manually movable on the holder toward and away from its storage position to circuit-closing position thereon; means operative by movement of the unit to the closed-circuit position for flexing said thermostat to close said switch; and means for automatically imparting to the unit a limited movement in the opposite direction, whereby the means first-mentioned is rendered inoperative, the means last-mentioned becoming operative on manual release of the unit, said thermostat being in heat transfer relation with said heating element and adapted to pass abruptly and automatically to its reverse position to open said switch at a predetermined temperature.

3. In an electric cigar lighter, the combination of a holder; a heating element; an igniting unit carrying the heating element movably mounted on and completely removable from the holder for use; a thermostatically controlled means connecting the heating element in circuit with the source of current when the unit is inserted within the holder and said element below a predetermined temperature, said means including a normally open switch for closing said circuit; a thermostatic element which is flexible in either of two directions, one of which closes the switch and the other of which reopens the switch, said element being adapted to flex upon the heating element attaining a temperature exceeding that first-mentioned to open the circuit; actuating means mounted on the holder and movable by the igniting unit for applying a thrust to flex the thermostat when the igniting unit is moved on the holder from a predetermined position thereon; and spring means for urging said actuating means to move into the opposite direction after manual movement thereof by the igniting unit whereby the actuating means is moved out of association with said switch.

4. In an electric cigar lighter, the combination of a holder; a heating element; an igniting unit carrying the heating element and storable on and completely removable from said holder for use; a thermostatically controlled means for connecting the heating unit in circuit with a source of current when the unit is inserted within the holder and said element is below a predetermined temperature, said means including a normally open switch for closing said circuit, a thermostatic element which is flexible in either of two directions one of which closes the switch and the other of which reopens the switch, said element being adapted to reverse its flexure to that last-mentioned on said heating element attaining a temperature exceeding that first-mentioned, the igniting unit being movable on the holder away from storage position thereon and adapted to actuate thrust means for flexing the thermostat when the igniting unit is thus moved, a structure movable on the holder with the igniting unit when the latter is moved as last-mentioned manually, a spring means for urging said structure to move in the opposite direction after said manual movement thereof, said structure carrying subdivisions of said circuit, and an impositive latching means parts whereof are carried by said structure and the unit for effecting a coupling between the unit and said structure as the unit nears the end of its said manual movement.

5. In an electric cigar lighter, the combination of a holder; a heating element; an igniting unit carrying the heating element and storable on and completely removable from said holder for use; a thermostatically controlled means for connecting the heating unit in circuit with a source of current when the unit is inserted within the holder, said means including a normally open switch for closing said circuit, a thermostatic element which is flexible in either of two directions one of which closes the switch and the other of which reopens the switch; and wedge means carried by said holder and actuated by said unit for imparting a thrust against said thermostatic element to flex the same to close the switch when the unit is moved on the holder away from storage position thereon, said element being adapted to reverse its flexure to that last-mentioned on said heating element attaining a predetermined temperature.

6. In an electric cigar lighter, the combination of a holder; a heating element; an igniting unit carrying the heating element and storable on and completely removable from said holder for use; a thermostatically controlled means for connecting the heating unit in circuit with a source of current when the unit is inserted within the holder, said means including a normally open switch for closing said circuit, a thermostatic element which is flexible in either of two directions one of which closes the switch and the other of which reopens the switch; wedge means carried by the holder and actuated by the igniting unit for imparting a thrust against said thermostatic element to flex the same to close the switch when the unit is moved on the holder away from storage position thereon; and means for moving the unit in the opposite direction to withdraw said wedge means from the field of operation of the thermostat on manual release of the unit at the end of its said movement away from storage position, said thermostatic element being adapted to reverse its flexure to that last-mentioned on said heating element attaining a temperature exceeding a predetermined one.

7. In an electric cigar lighter, a holder having a recess; an igniting unit insertable in said recess and completely removable from the holder for use, said unit being manually movable within said recess from an open-circuit position to a first closed-circuit position and thence to a second closed-circuit position; a heating element carried by the igniting unit; a contact constituting one terminus of a circuit subdivision through the element and the holder; a structure movable in the holder and yieldingly urged toward the unit-receiving entrance to said recess; means adapted to impositively couple said structure and the unit when the latter is moved to said first closed-circuit position, said structure having a contact for cooperating with the contact first-mentioned to close a circuit through the heating element when the igniting unit is moved to said first closed-circuit position, said structure being moved away from said entrance by the last-mentioned movement of the unit; means for normally maintaining the circuit open and operable after a closing of the circuit to again open the same when the heating element attains a predetermined useful temperature, said means including a deformable heat-responsive snap member in heat-receiving relation with the heating element; and cam-like actuating means carried by the movable structure and operative on moving the unit to said first closed-circuit position for mechanically deforming said snap member to close the circuit, the means last-mentioned being removed from the field of operation of said snap member by movement of the unit from said first closed-circuit position to said second closed-circuit position, this movement of the unit being effected by automatic return movement of said structure toward said entrance on manual release of the unit after a movement thereof to said first closed-circuit position.

8. In an electric cigar lighter, a holding device; an igniting unit having a heating element and supported by the holding device and removable therefrom for use, said unit being manually movable on the holding device from storage position thereon; means for closing a normally open circuit through the heating element when the igniting unit is moved away from said storage position, said means including a bimetallic element adapted to be positively flexed in one direction to thereby close said circuit but adapted automatically to flex in the opposite direction when heated to thereby open said circuit; and means movable with the unit and mechanically acting against the bimetallic element to apply a pressure in a direction at an angle to the general plane of said element to flex the same to its circuit-closing position when said unit is moved from its storage position on said holder.

9. In an electric cigar lighter, the combination of a holder; a heating element; an igniting unit carrying the heating element and storable on and completely removable from said holder for use; a thermostatically controlled means for connecting the heating unit in circuit with a source of current when the unit is inserted within the holder, said means including a normally open switch for closing said circuit, a thermostatic element which is flexible in either of two directions, one of which closes the switch and the other of which reopens the switch; and means including a cam and follower therefor operative by movement of the unit to circuit-closing position to cause said bimetallic element to flex to the circuit-closing position, said follower adapted to impart a thrust against the bimetallic element in a direction at an angle to the direction of movement of the igniting unit on the holding device.

10. In an electric cigar lighter, the combination of a holder; an igniting unit carrying a heating element, said unit being movable on the holder for energization; a normally open switch having a bimetallic thermostat adapted to abruptly flex in either of two opposite directions, said thermostat when flexed in one direction adapted to close the switch and thereby close said circuit to cause energization of the heating element when the igniting unit is on the holder; and means adapted upon movement of the igniting unit away from storage position to flex said thermostat to closed-circuit position, said means including a cam actuated upon movement of said unit and a follower therefor secured to said thermostat, said thermostat being in heat transfer relation with said heating element and adapted to abruptly flex to the open-circuit position at a predetermined temperature.

11. In an electric cigar lighter, a holder; a heating element; an igniting unit carrying said element and positionable on and removable from the holder; means for energizing said element including a circuit having subdivisions carried by the holder; a normally open switch having a bimetallic thermostat adapted to abruptly flex in either of two opposite directions, said thermostat when flexed in one direction adapted to close the switch and thereby close said circuit to cause energization of the heating element; and means for causing said element to flex to circuit-closing position, said means including a substantially conical portion carried by said holder constituting a wedge actuator for flexing the thermostat to close the switch when the unit is moved on the holder away from storage position thereon, said thermostat being in heat-responsive relationship with the heating element whereby the former, after a predetermined temperature has been attained by said element, will flex in the reverse direction thereby opening said circuit.

GUSTAVE F. BAHR.